F. A. Morley,
Green Corn Knife.
Nº 57,361.  Patented Aug. 21, 1866.
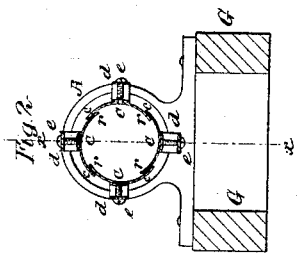
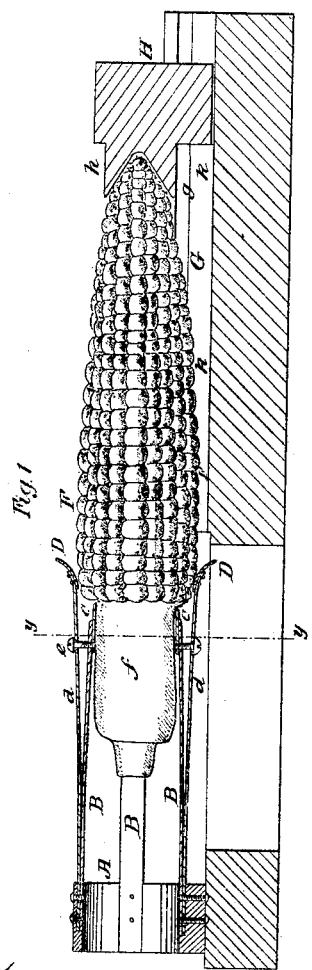
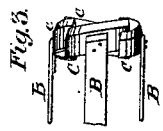
Witnesses
Inventor
F. A. Morley

UNITED STATES PATENT OFFICE.

F. A. MORLEY, OF NEW YORK, N. Y.

IMPROVED DEVICE FOR CUTTING CORN FROM THE COB.

Specification forming part of Letters Patent No. 57,361, dated August 21, 1866.

*To all whom it may concern:*

Be it known that I, F. A. MORLEY, of the city, county, and State of New York, have invented a new and Improved Machine for Cutting Green Corn from the Cob; and I do hereby declare that the following is a full, clear, and exact description thereof, which will enable those skilled in the art to make and use the same, reference being had to the accompanying drawings, forming part of this specification, in which—

Figure 1 is a vertical longitudinal section taken in the line $x\ x$, Fig. 2. Fig. 2 is a cross-section taken in the line $y\ y$, Fig. 1; and Fig. 3 is a detail view.

Similar letters of reference indicate corresponding parts.

This invention relates to new and useful improvements in machines for cutting green corn from the cob, whereby a simple and efficient device for this purpose is obtained and an important saving in labor is made, as hereinafter explained.

G is a bed-plate, which has a socket or ring, A, secured to one end, and to this socket is secured four knives, C C, Fig. 1, by means of the spring-shanks B B. These knives C C are arranged so as to form a ring, as shown by C C C C, Figs. 2 and 3, the edges of the knives overlapping each other, with the side edge, $c$, of each knife on the outside and the side edge, $r$, Fig. 2, on inside of the lap, and also the inside edge, $r$, of each knife standing out, while the cutting-edge on the outside edge, $c$, is dropped back, so as to leave the cutting to be done in all cases by the inner cutting-edge of each lap.

D D, Fig. 1, are guides and gages. There is one of them for each knife C, and they are secured to the shanks B or the socket A by means of the shanks $d\ d$, and are then connected to the knives C by set-screws $e$.

F, Fig. 1, shows the surface of an ear of corn, and $f$ shows the cob of the same. The guides or gages D, Fig. 1, ride on the surface of the corn in advance of the cutting-edges of the knives, and hold the knives at a certain depth of cut, which may be varied at will by the set-screws $e\ e$.

H is a sliding block or head, which has guides sliding in grooves $g$, and the part $h$ has a centering-cavity for receiving one end of the corn. The bed block or plate G has a longitudinal groove, $k\ k$, for holding the ear until it is taken up by the head $h$ H and guides D D.

Its operation is as follows: An ear of corn is laid in the groove or depression $k\ k$ in the bed-plate, and the block or sliding head H is then pushed forward, forcing one end of the ear into the guides D D, which pick that end of the ear up and center it for the knives, while the pressure upon the block H causes that end of the ear to be picked up also and centered by $h$.

The knives C and their gages or guides D are made so that they will cut the smallest ears, and they readily expand to accommodate the largest ears.

The natural tendency of the knives is to cut down into the ear; but the gages D, riding along on the surface of the corn, govern the cut, and the knives follow the general shape or contour of the ear very accurately, and the machine cuts all sizes of ears with readiness and facility.

The object of dropping the cutting-edges back at one side is, first, to prevent corn from being pushed in between the overlapping parts of the knives; and, second, to give the cutting-edges of the knives an oblique angle, so as to get the benefit of a drawing cut.

Having thus described my invention, what I claim as new, and desire to secure by Letters Patent, is—

1. The four knives C C C C, forming an elastic cutting-ring, their cutting-edges $c\ r$ being overlapped, and each knife having its side edge, $c$, on the outside of the lap and the opposite edge, $r$, on the inside of the lap, and having oblique cutting-edges, in connection with the bed-piece G, having a trough or groove, $k$, and sliding head-block H, as and for the purpose herein shown and described.

2. Gages or guides D, in connection with the knives C and set-screws $e$, for regulating the depth of the cut and allowing all sizes of ears to be run through, as herein shown and explained.

F. A. MORLEY.

Witnesses:
  WM. F. MCNAMARA,
  GEO. FREDK. GUSTAVE DIETERICH.